United States Patent [19]

Pockrandt

[11] Patent Number: 5,062,895

[45] Date of Patent: Nov. 5, 1991

[54] CHEMICAL COMPOSITION, AND METHODS OF CONSTRUCTING AND UTILIZING SAME

[76] Inventor: Frank J. Pockrandt, 3337 Michael, Warren, Mich. 48091

[21] Appl. No.: 382,304

[22] Filed: Jul. 20, 1989

[51] Int. Cl.$^5$ .......................... C09K 3/14; C09K 3/18; B25B 13/00; B22F 7/02
[52] U.S. Cl. ...................................... 106/36; 428/552; 428/908.8; 81/186; 81/900; 411/408
[58] Field of Search .................... 106/36; 81/900, 186; 428/552, 908.8; 419/9, 10; 411/408

[56] References Cited

U.S. PATENT DOCUMENTS 2,787,967  4/1957  Nohejl ...................................... 104/1
3,656,522  4/1972  Ingimarsson ...................... 145/50 A
4,778,730  10/1988  Zucker ................................ 428/552

FOREIGN PATENT DOCUMENTS 2063743  1/1981  United Kingdom .................. 81/900

OTHER PUBLICATIONS

ScrewGrab Distributor price schedule, Effective 10/88; Front and Back of Display Package for "ScrewGrab"; Front and Back of Container for ScrewGrab product from Armstrong Tech, Inc., Three Rivers, Mich.
"The Condensed Chemical Dictionary", Eighth Edition, 1971, Edited by G. G. Hawley, pp. 273, 393, 783 and 826.
Clover Compound News, 12/4/83.

Primary Examiner—William R. Dixon, Jr.
Assistant Examiner—Michael Marcheschi
Attorney, Agent, or Firm—Irving M. Weiner; Robert M. Petrik; Joseph P. Carrier

[57] ABSTRACT

A composition including ethylene glycol and friction particles mixed together in predetermined proportions. The composition is used to aid in the removal of headed fasteners. The composition may also be used in place of a lock washer. The composition is most effective when used with fasteners made of soft metals.

25 Claims, No Drawings

CHEMICAL COMPOSITION, AND METHODS OF CONSTRUCTING AND UTILIZING SAME

BACKGROUND OF THE INVENTION

1. Field of the Invention

The present invention relates to a compound adapted to aid in the removal and retention of bolts and screws. More particularly, the invention comprises a compound which aids a tool such as a screwdriver or socket wrench, grip the head of a headed fastener, such as a bolt or screw. This compound may also be used in place of a locking washer or where it is desired to provide friction between two objects to hold the objects relative to one another.

2. Description of Relevant Art

Heretofore, there have been various means for loosening headed fasteners and for locking the headed fasteners in place.

Previously, if a bolthead or screwhead was stripped, the fastener had to be drilled out. This is especially a problem when softer metals, such as aluminum, are used to make the fastener. This method is usually not acceptable since an oversized fastener had to be used in place of the stripped and drilled out fastener.

Also, previously, if it was desired to "lock" the fastener in place, a locking washer was used to prevent easy removal of the fastener. However, this method does not always provide the security and tightness required.

The novel composition of the present invention is directed toward eliminating stripped fastener heads and providing tighter and more secure fasteners.

SUMMARY OF THE INVENTION

The present invention provides a composition which comprises as the basic ingredients thereof ethylene glycol in paste form and friction particles. The friction particles are suspended in the paste, the particles being between 50 and 200 micrometers in size. The novel composition is particularly useful in the removal of fasteners, such as bolts, without stripping the head of the fastener. The composition may also be used in place of a lock washer and may be used to aid in the removal of a fastener with a previously stripped head.

It is a primary object of the present invention to provide a novel composition to allow easy removal of fasteners such as bolts and screws.

It is a further object of the present invention to provide a novel composition for aiding in the removal of fasteners with stripped heads.

It is a further object of the present invention to provide a novel composition which can be used to provide greater friction than is normally created between objects, thus providing better holding power.

The above and further objects, details and advantages of the invention will become apparent from teh following detailed description.

DETAILED DESCRIPTION OF THE PREFERRED EMBODIMENTS

The novel composition in accordance with the present invention includes as the basic ingredients thereof ethylene glycol paste and friction particles.

Preferably, but not necessarily, the friction particles comprise flint particles from 50 micrometers in size to 200 micrometers in size suspended in the ethylene glycol paste. The friction particles may also comprise ground glass, ground metals including stainless steel diamond dust or sand. It is most desirable for these other materials to also be in the size range as discussed above.

The composition is prepared by mixing substantially one pint of ethylene glycol paste with substantially one-quarter pound of friction particles.

It is envisioned that flint be used as the friction particles since it is the most cost effective material. However, diamond dust is the most effective friction particle material in terms of providing friction on the fasteners.

A specific size of the friction particles is preferably selected in dependence on the relative size of the fasteners on which the composition is to be used. Fine friction particles having a size near the lower end of the above range should preferably be used for small fasteners, with course friction particles having a size near the upper end of the above range used for large fasteners.

In use, a small amount of the composition of the present invention is placed on either the tool or the fastener sufficient to coat the engaging surface thereof. The tool can then be used to remove the fastener. The composition may also be applied to a nut used in conjunction with a fastener.

The compound of the present invention aids the tool in removing the fastener by providing greater friction along the contact surfaces of the tool and fastener. Thus, the force or torque applied to the fastener head is more evenly distributed along these contact surfaces and the head of the fastener is not damaged or stripped by excessive pressure on localized contact surfaces.

The compound acts in a similar manner when removing a fastener with a previously stripped head.

Additionally, the compound of the present invention may be used between objects, such as in the place of a lock washer. It has been found that more force or torque is required to remove a fastener with the composition of the present invention used in place of a lock washer than that required when the fastener is provided with a lock washer. It is also envisioned that the compound of the present invention may be used between any two objects where it is desired that the two objects do not move relative to one another. The objects may include clips, seals, rings, etc., as is well known in the various arts. This is possible because of the increased friction provided by the novel compound of the present invention.

Although not specifically disclosed hereinabove, it is further contemplated that various additives or excipients may be added to the aforesaid composition as desired. Further, although the composition has been described hereinabove, and is provided in a paste form, it is contemplated that, if desired, the composition may be provided in other convenient forms.

I claim:

1. A composition for use in the insertion, removal and retention of fasteners, comprising:
   ethylene glycol paste; and
   friction particles suspended throughout said paste for providing friction between a tool and a fastener;
   said compound comprising a mixture of substantially one-quarter pound of friction particles per substantially one pint of ethylene glycol paste;
   said composition being adapted to be applied to engaging surfaces of at least one of said fastener and said tool to prevent stripping of said fastener;

a size of said friction particles being generally in a range between 50 micrometers and 200 micrometers, and said size of said friction particles being specifically determined within said range in dependence on a size of fasteners to be removed.

2. The composition of claim 1, wherein:
said friction particles comprise flint particles.

3. The composition of claim 1, wherein:
said friction particles comprise metal particles.

4. The composition of claim 3, wherein:
said metal is stainless steel.

5. The composition of claim 1, wherein:
said friction particles comprise sand.

6. The composition of claim 1, wherein:
said friction particles comprise diamond dust.

7. The composition of claim 1, wherein:
said friction particles are approximately 50 micrometers in size for use in conjunction with small fasteners.

8. The composition of claim 1, wherein:
said friction particles are approximately 200 micrometers in size for use in conjunction with large fasteners.

9. A method of removing fasteners, comprising:
applying a small amount of a composition comprising ethylene glycol paste and friction particles, onto an engaging surface of one of a fastener and a tool, said amount being sufficient to coat said engaging surface;
said composition comprises a mixture of substantially one-quarter pound of friction particles per substantially one pint of ethylene glycol paste;
attaching said tool for applying torque to said fastener; and
removing said fastener.

10. The method of claim 9, wherein:
a size of said friction particles is generally selected to be in a range between 50 micrometers and 200 micrometers, and said size of said friction particles is specifically determined within said range in dependence on a size of the fasteners to be removed.

11. The method of claim 10, wherein:
said friction particles comprise flint particles.

12. The method of claim 10, wherein:
said friction particles comprise sand.

13. The method of claim 10, wherein:
said friction particles comprise diamond dust.

14. The method of claim 10, wherein:
said friction particles are selected to be approximately 50 micrometers in size for use in conjunction with relatively small fasteners; and
said friction particles are selected to be approximately 200 micrometers in size for use in conjunction with relatively large fasteners.

15. A composition for use in preventing movement between two objects, comprising:
ethylene glycol paste;
friction particles suspended throughout said paste for enhancing friction between engaging surfaces of said objects;
said composition comprises a mixture of substantially one-quarter pound of friction particles per substantially one pint of ethylene glycol paste;
said friction particles having a size in a range of 50-200 microns;
said composition being adapted to be applied as a coating to an engaging surface of at least one of said objects; and
said composition providing greater friction between said engaging surfaces of said objects than is normally created between said objects.

16. A method for eliminating lock washers in conjunction with headed fasteners, comprising:
providing a small amount of a composition comprising ethylene glycol and friction particles, onto at least one of an object-engaging surface of a fastener head and a fastener head-engaging surface of an object, to be fastened said small amount being sufficient to provide a thin film between said engaging surfaces of said fastener head and said object; and
securing said fastener to said object by providing torque to a head of said fastener until said fastener is tightly fastened to said object.

17. The method of claim 16, wherein:
said friction particles comprise flint with particles in the size range between 50 micrometers and 200 micrometers.

18. The method of claim 16, wherein:
said compound comprises a mixture of substantially one-quarter pound of friction particles per substantially one pint of ethylene glycol paste.

19. The method of claim 18, wherein:
said friction particles are formed from materials selected from a group consisting essentially of flint, glass, stainless steel, diamond dust and sand.

20. A composition for use in the insertion, removal and retention of fasteners, comprising:
a glycol paste; and
friction particles suspended throughout said paste for providing friction between a tool and a fastener;
said compound comprising a mixture of substantially one-quarter pound of friction particles per substantially one pint of said glycol paste;
said composition being adapted to be applied to engaging surfaces of at least one of said fastener and said tool to prevent stripping of said fastener;
a size of said friction particles being generally in a range between 50 micrometers and 200 micrometers, and said size of said friction particles being specifically determined within said range in dependence on a size of said fastener.

21. A composition for use in the insertion, removal and retention of fasteners, comprising:
a glycol paste; and
friction particles suspended throughout said paste for providing friction between a tool and a fastener;
said composition being adapted to be applied to engaging surfaces of at least one of said fastener and said tool to prevent stripping of said fastener;
a size of said friction particles is generally in a range between 50 micrometers and 200 micrometers, and said size of said friction particles is specifically determined within said range in dependence on a size of said fastener.

22. A method of removing fasteners, comprising:
applying a small amount of a composition, comprising a glycol paste and friction particles, onto an engaging surface of one of a fastener and a tool, said amount being sufficient to coat said engaging surface;
said composition comprises a mixture of substantially one-quarter pound of friction particles per substantially one pint of said glycol paste;
attaching said tool for applying torque to said fastener; and removing said fastener.

23. The method of claim 22, wherein:

a size of said friction particles is generally selected to be in a range between 50 micrometers and 200 micrometers, and said size of said friction particles is specifically determined within said range in dependence on a size of the fastener to be removed.

24. A composition for use in preventing movement between two objects, comprising:

a glycol paste;

friction particles suspended throughout said paste for enhancing friction between engaging surfaces of said objects;

said composition comprises a mixture of substantially one-quarter pound of friction particles per substantially one pint of said glycol paste;

said friction particles having a size in a range of 50-200 microns;

said composition being adapted to be applied as a coating to an engaging surface of at least one of said objects; and said composition providing greater friction between said engaging surfaces of said objects than is normally created between said objects.

25. A method for eliminating lock washers in conjunction with headed fasteners, comprising:

providing a small amount of a composition, comprising a glycol and friction particles, onto at least one of an object-engaging surface of a fastener head and a fastener headengaging surface of an object, said small amount being sufficient to provide a thin film between said engaging surfaces of said fastener head and said object; and securing said fastener to said object by providing torque to a head of said fastener until said fastener is tightly fastened to said object.

* * * * *

UNITED STATES PATENT AND TRADEMARK OFFICE
CERTIFICATE OF CORRECTION

PATENT NO. : 5,062,895

DATED : November 5, 1991

INVENTOR(S) : Frank J. Pockrandt

It is certified that error appears in the above-identified patent and that said Letters Patent is hereby corrected as shown below:

In column 1, line 57, change "teh" to -- the --.

Signed and Sealed this

Thirtieth Day of March, 1993

Attest:

STEPHEN G. KUNIN

Attesting Officer

Acting Commissioner of Patents and Trademarks